(12) United States Patent
Sharma et al.

(10) Patent No.: US 8,787,364 B2
(45) Date of Patent: *Jul. 22, 2014

(54) SERIAL MEMORY AND IO ACCESS ARCHITECTURE AND SYSTEM FOR SWITCHED TELECOMMUNICATION AND COMPUTING PLATFORMS

(75) Inventors: Viswa Nath Sharma, San Ramon, CA (US); Barton W. Stuck, Westport, CT (US); Ching-Tai Hu, Fremont, CA (US); Yi-chang Chou, Fremont, CA (US); William Chu, Elmsford, NY (US)

(73) Assignee: Psimast, Inc

( * ) Notice: Subject to any disclaimer, the term of this patent is extended or adjusted under 35 U.S.C. 154(b) by 0 days.

This patent is subject to a terminal disclaimer.

(21) Appl. No.: 13/421,826

(22) Filed: Mar. 15, 2012

(65) Prior Publication Data
US 2012/0170492 A1 Jul. 5, 2012

Related U.S. Application Data

(62) Division of application No. 11/828,329, filed on Jul. 25, 2007, now Pat. No. 8,165,111.

(60) Provisional application No. 60/820,243, filed on Jul. 25, 2006, provisional application No. 60/822,171, filed on Aug. 11, 2006, provisional application No. 60/887,989, filed on Feb. 2, 2007.

(51) Int. Cl.
*H04L 12/50* (2006.01)

(52) U.S. Cl.
USPC .......................................... 370/366; 370/463

(58) Field of Classification Search
None
See application file for complete search history.

(56) References Cited

U.S. PATENT DOCUMENTS

| 7,917,682 | B2* | 3/2011 | Bakthavathsalam | 710/315 |
| 7,929,565 | B2* | 4/2011 | Winter | 370/466 |
| 2002/0091884 | A1* | 7/2002 | Chang et al. | 710/58 |
| 2006/0206647 | A1* | 9/2006 | Stahl et al. | 710/301 |
| 2007/0124529 | A1* | 5/2007 | Carr et al. | 710/317 |

* cited by examiner

*Primary Examiner* — Clemence Han

(57) ABSTRACT

A computing and communication architecture utilizes a serial protocol based switched fabric among circuit cards housed in packaging arrangement. In one embodiment, each circuit card connected to the serial protocol based switched fabric in the packaging arrangement is provided with a protocol processor that enables all of the circuit cards to efficiently provide packet-based serial self-clocked communications at line speed. As a result, it is not necessary to arrange the circuit cards in a hierarchical manner in order to address the problems of switch blocking and related traffic congestion issues that would otherwise limit the implementation of the serial protocol based backplane arrangement for housing circuit cards.

11 Claims, 6 Drawing Sheets

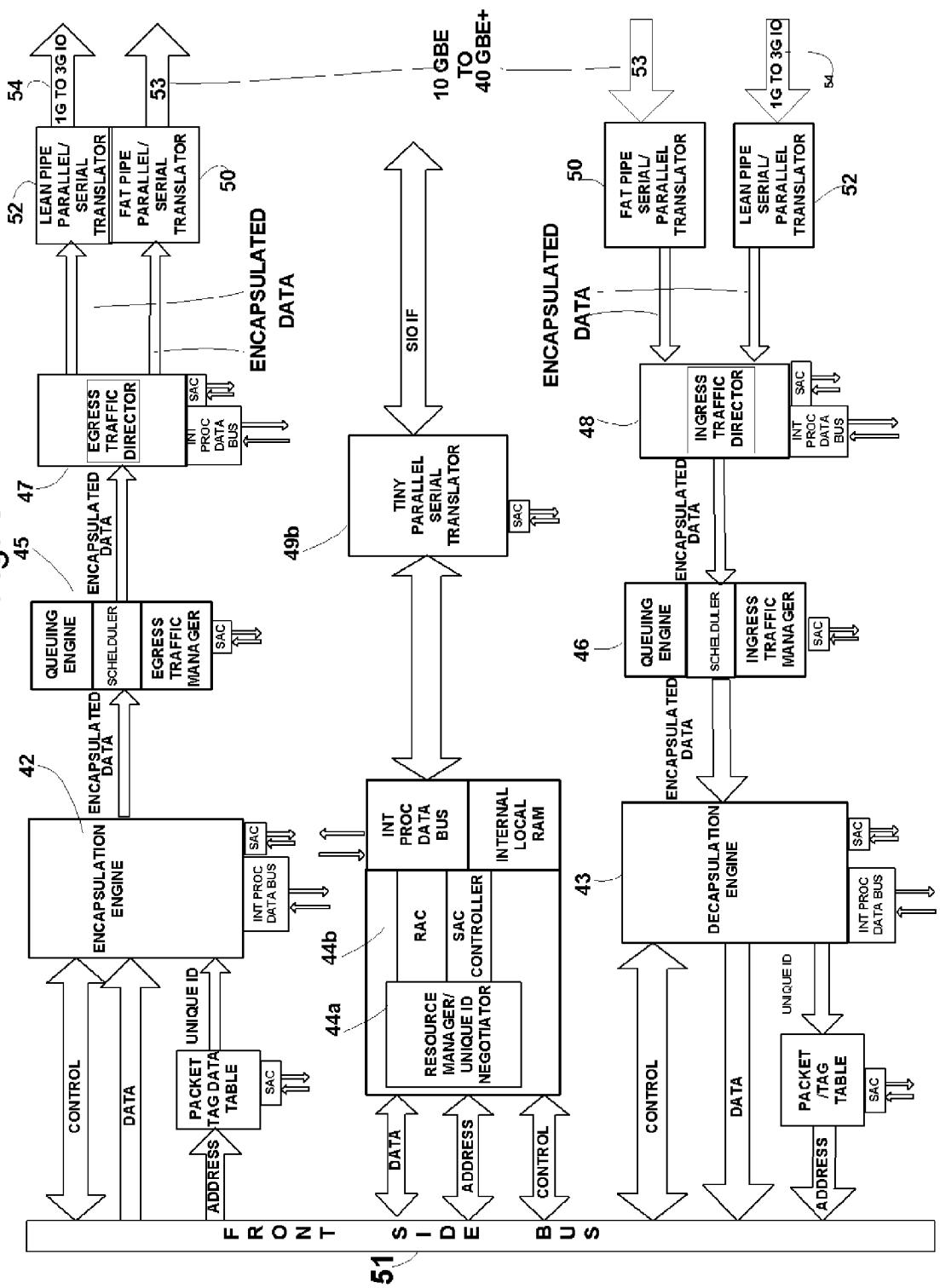

US 8,787,364 B2

SERIAL MEMORY AND IO ACCESS ARCHITECTURE AND SYSTEM FOR SWITCHED TELECOMMUNICATION AND COMPUTING PLATFORMS

CROSS-REFERENCE TO RELATED APPLICATIONS

The present application is a divisional application of non-provisional application Ser. No. 11/828,329 filed Jul. 25, 2007, now U.S. Pat. No. 8,165,111 which claims priority to U.S. Provisional Application Ser. No. 60/820,243, filed Jul. 25, 2006, entitled "Telecommunication and Computer Platforms Having Advanced TCA Based Packaging and Ethernet Switched Fabric," Ser. No. 60/822,171, filed Aug. 11, 2006, entitled "Enhanced Ethernet Protocol for Shortened Data Frames Within a Constrained Neighborhood Based on Unique ID," and Ser. No. 60/887,989, filed Feb. 2, 2007, entitled "Processor Chip Architecture Having Integrated High-Speed Packet Switched Serial Interface," the disclosure of each of which is hereby incorporated by reference.

FIELD OF THE INVENTION

The present invention relates generally to the field of computer architectures, and more specifically to industry standards compliant telecommunication and computing platforms that utilize a serial packet protocol over a switched fabric among circuit cards housed in a packaging arrangement.

BACKGROUND OF THE INVENTION

In essence, a conventional computer system that realizes the 'Von Neumann Architecture' comprises a core set of communicatively interconnected functional units which may be viewed as the fundamental operational blocks of a computer system. The functional units, singly or in combination with other functional units, are capable of performing one or more operations. The interconnections can be physical, logical or both. The core functional units include a processing subsystem that executes instructions and acts upon data, a memory subsystem that cooperates with the processing subsystem to enable selected data and instructions to be stored and transferred between the two subsystems, an input/output (I/O) subsystem that allows at least the processing subsystem to exchange data and instructions with the network and peripheral environment external to the computer and a bus system over which the data and instruction interchange occur.

This set of functional units can be configured into different computer system structures using various communication interconnection arrangements that govern the interchange of communications and the interactions between the functional units. Each such structure has associated with a computer system architecture and a computer system organization. System architecture represents those attributes of the structure that are related to the logical execution of a given program on the system. The instruction set, the word length, data types, bus protocol, memory addressing, I/O modalities and other attributes that factor into the design of software for the particular system may be considered features of a specific system architecture. Computer organization, on the other hand, refers to a topology comprising hardware units and their interconnections that are operative to realize one of more of the system architectures. For example, the Central Processing Unit (CPU), the main memory organization, and the I/O and bus systems may be interconnected to realize the Personal Computer (PC) architecture as an example of one of the many kinds of computer architectures.

The Personal Computer (PC) represents the most successful and widely used computer architecture. Architecturally, not much has changed since the PC was first introduced in the 1980s. From a system organization perspective, a typical PC is comprised of a single circuit board, referred to as a motherboard, that includes a microprocessor which acts as the central processing unit (CPU), a system memory and a local or system bus that provides the interconnection between the CPU and the system memory and I/O ports that are typically defined by connectors along an edge of the motherboard. One of the key reasons for the success of the PC architecture is the standardized manner by which the components are interconnected.

A more recent example of another computer architecture based industry standards is the server blade based system architecture popular in the high performance computing (HPC) arena. The server blade architecture is based upon a computer organization where circuit boards or cards containing circuitry, referred to as blades, are adapted to deliver specialized functionality and are co-located within a unitary housing and coupled together by a backplane. Typically, the blades can be replaced during operation, but without interruption of the computer's operation, by other blades of the same or different functionality. Exemplary blades may include server blades, memory blades, I/O blades, PC blades, management blades, and storage blades. The backplane routes large amounts of data among different blades. In most of these HPC blade configurations, the backplane fabric is implemented by a standardized parallel bus interconnection technology such as the PCI bus.

The fundamental operational blocks of a computer system may be organized in the form of multiprocessor based, multi-core based, single-instruction-multiple-data (SIMD) or multiple-instruction-multiple-data (MIMD) capable parallel processor interconnections, message passing structures and other arrangements well known in the art. Each such computer organization supports a computer architecture requiring data operations involving one or more central-processing units (CPUs) and a general-purpose "main memory." Any computer organization is likely to include at least a few basic arithmetic logic units as part of the at least one CPU that are configured to communicate with memory using a memory access operation(s) generally transparent to the program running on the CPU.

The technology enabling the memory access operation is often referred to as memory access technology (MAT) and is transparent to the program or code executing on the CPU. The term "memory" itself conventionally denotes a plurality of memories forming a memory hierarchy to allow the CPU the fastest access possible to the largest amount of memory and the fastest transfer rate. The memory hierarchy includes at least one general-purpose, relatively low-cost "main memory." Memories in the memory hierarchy that are above the main memory are typically small, high-cost memories that provide relatively fast access and transfer times than the main memory. General purpose registers and the various levels of cache memories comprising, Static RAM (SRAM) for example, are fast memories. Fast memories are generally co-located with the arithmetic logic unit (ALU) within the CPU package to allow fast access and transfer rates by the CPU.

Conventional computer architectures are configured to dynamically move data within the various levels of memory in the memory hierarchy responsive to the data requirements of the CPU unfolding during program execution. The main memory is the first memory in the memory hierarchy which can be explicitly assessed under program control. Accesses and transfers from memories higher up in the memory hierarchy than the main memory, are generally independent of program control although a program can indirectly control movement of data to and from these memories by appropriately structuring the program to influence temporal and spatial locality of instructions and data that need to be fetched and stored in the fast memory. Main memory includes, for example, Dual Inline Memory Module (DIMM), Dynamic Random Access memory (DRAM), Synchronous DRAM (SDRAM), Double Data Rate SDRAM (DDR SDRAM). The main memory and all memories above the main memory in the memory hierarchy are directly accessible by the CPU. The memories below the main memory may be accessed as input/output (I/O). Hard disk drives, flash drives, peripheral device memories and network accessible storage are examples of such lower level memories. Transfers and access from and to these memories is relatively slow but they make a large memory capacity available at lower cost. The main memory may store data and/or instructions and while the main memory is hierarchically lower than the fast register and cache memory that are generally consider part of the CPU, the main memory represents a balance between access times, transfer rates, capacity and cost and is a workhorse among all the memories in the memory hierarchy.

Moore's law conjectures that transistor densities on board a processor chip double every 18 months or so, thereby doubling the clock rates of the processor chips. The pace of evolution of processor clock rates remains unmatched by memory clock rates which double over a much longer period of time. Consequently, data transfer rates from the main memory to the processor remain much slower than the rates at which the processor can process the fetched data. This is a phenomenon known as the bandwidth bottleneck in which advances in memory and bus technologies have lagged behind advances in CPU speed. Processors and memories that can operate at upwards of 3 GHz clock are now common, but local system buses that can operate as a parallel bus interconnection at speeds approaching the processor speeds are unknown. While there have also been significant strides with respect to the available memory capacity, technologies to effectively exploit the capacity without constraining CPU throughput remain elusive. For example, the system bus on a Pentium 4 microprocessor, referred to as the front side bus, operates upwards of 800 MHz, while the processor operates at multiple GHz clock speeds. This bandwidth bottleneck caused by the latencies introduced by memory access and transfer over current parallel bus memory access technologies severely limits the total throughput a contemporary CPU can deliver. The problem created by this divergence between processor speeds and memory access speeds is well known and has been referred to as the memory gap or memory wall problem. See, e.g., Cuppa et al., "Organizational Design Trade-Offs at the DRAM, Memory Bus and Memory Controller Level: Initial Results", *University of Maryland Systems & Computer Architecture Group Technical Report* UMD-SCA-1999-2, November 1999.

One of the methodologies employed in the prior art to overcome the memory wall is to directly interconnect the CPU and the main memory so that data and instructions move over relatively short distances. Parallel bus architectures are conventionally the most common means for communications between the CPU and the main memory. An arrangement that positions main memory as close as possible to the CPU provides maximum bandwidth at minimum latency by reducing bus-related latencies. Capacity of available memory can be increased to a certain extent by expanding the bus-width between the CPU and the main memory so as to allow a larger amount of memory to be addressed as well as to increase the overall throughput. However, limitations in pin counts available for coupling the CPU to the main memory severely curtail the size of memory that can be so coupled.

One prior art technique attempts to bridge the processor-memory performance gap by using a three dimensional integrated circuit technology that allows various memory sub-modules to be located proximate to the CPU in layered arrangements within a single package and interconnected to the CPU by short vertical wires. An exemplary model is described in Cristianto C. Liu, Illya Ganusov, Martin Burtscher, and Sandip Tiwari, "Bridging the Processor-Memory Performance Gap with 3D IC Technology," IEEE Design and Test of Computers, November-December 2005, pp. 556-564. While this technique has the potential to deliver gains in terms of speed of memory access and transfer, the technique is still restricted by the size (alternatively the capacity) of memory that can be cost-effectively implemented within a monolithic package given the logic density and heat dissipation issues that may need to be resolved.

In addition to packaging related issues, there are other parallel bus design issues that depend on the distance separating the CPU from the main memory. Depending on whether the CPU and a relevant main memory are resident on the same board, on different boards, or part of different systems, bus-related latencies and the resultant degradation in the throughput of the CPU may be significantly different. Parallel bus architectures have inherent limitations that restrict the separation between the CPU and the main memory and also limit the number of parallel lanes (i.e. the width) of the parallel bus. For example, signals traveling on separate traces are prone to degradation by signal attenuation, noise, crosstalk and clocking skew. In addition, the parallel traces can take up a large amount of the circuit board real-estate. The energy expended in pushing the data bits at high data rates through the traces of the bus can lead to increased ground bounce and noise problems. The parallel traces for a parallel bus may need to be constructed with special path-lengthening convolutions to equalize minute differences in path lengths introduced by routing the bus along a curved path on the circuit board. The variation in the path lengths of the traces of the parallel bus will introduce timing discrepancy between signals whose effects are exacerbated at high data transfer rates. Moreover, since each physical trace is bi-directional, the bus has to switch between transmitting and receiving which inherently adds to the bus-latency.

One solution to the memory wall/memory gap problem is to replace the parallel bus interface between CPU and main memory with serialized bus technology. Serialized bus technology generally involves paired, uni-directional, point-to-point interconnects which carry packetized data. The data or command word intended for the parallel bus architecture, is first recast into a plurality of packets which are serially transferred over one of the point-to-point interconnects and reconstructed into the data or command word at the receiving end. To obtain higher throughput, multiple serial links configured in the form of a narrow bus may be used. Each link is clocked independently of the rest making the set of links more skew tolerant than conventional parallel bus technology.

An early attempt to establish a standardized serial interface between processors and memories was the Scalable Coherent Interface. Gustayson, D. and Li, Q., "The Scalable Coherent Interface (SCI)". IEEE Communications (August 1996). Unfortunately, this proposal was ahead of its time and was not widely adopted.

Several proprietary high-speed serial interfaces between processors and memory have been developed by chip manufacturers. Exemplary serial bus implementations include the AMD® HyperTransport and the Intel® Advanced Switching Interconnect (ASI) switching fabrics that utilizes hierarchies and multiple high speed clocked serial data channels or proprietary packet switched Direct Memory Access (DMA) techniques as described, for example, in U.S. Pat. No. 6,766, 383. HyperTransport protocol requires a root-complex and operates in a master-slave mode. This protocol also requires an external clock to be transmitted with the communications thus making it unsuitable for out-of-the-box system-to-system communication over a network. Another prior art attempt to address the memory bottleneck is the recent fully buffered DIMM (FB-DIMM) memory access technology. FB-DIMM buffers the DRAM data pins from the channel through an advanced memory buffer (AMB) and uses point-to-point links with serial signaling to eliminate the stub bus. This serial bus architecture allows DIMM modules to be connected in series to allow a throughput upwards of 8.2 Gbs with a DDR2-800, for example. The serial signaling is similar to PCI-Express and like PCI-Express restricts the distance at which the main memory modules are located from the processor chip.

The migration from parallel to serial interfaces among components in a computing architecture is not unique to the processor/memory interface. Serial interfaces have also become the standard for almost all I/O communication channels. Industry standard I/O protocols, such as RapidIO, Infiniband, Fibre Channel and Gigabit Ethernet, can deliver I/O communications at rates approaching upwards of several gigabits per second.

While the speeds of a serial I/O protocol theoretically could approach the speeds needed for the processor/memory interface, these serial I/O communication protocols generally have larger packet and address sizes that are better suited for accessing large amounts of data stored on disk or over a network. The larger packet and address sizes results in an increased communication overhead penalty. In addition, there are different kinds of transmission blocking and memory contention concerns for I/O communications than for processor-to-memory interfaces.

U.S. Pub. App. No. 20050091304 discloses a control system for a telecommunication portal that includes a modular chassis having an Ethernet backplane and a platform management bus which houses at least one application module, at least one functional module, and a portal executive. In this patent application, a 1000BaseT (Gigabit Ethernet) backplane provides a packet-switched network wherein each of the connected modules acts as an individual node on a network in contrast to a conventional parallel bus connection such as a PCI bus.

U.S. Pub. App. No. 20060123021 discloses a hierarchical packaging arrangement for electronic equipment that utilizes an Advanced Telecommunication Computing Architecture (TCA) arrangement of daughter boards in the for an Advanced Mezzanine Card (AMC) that are interconnected with a hierarchical packet-based interconnection fabric such as Ethernet, RapidIO, PCI Express or Infiniband. In this arrangement, the AMCs in each local cube are connected in a hierarchical configuration by a first, lower speed interface such a Gigabit Ethernet for connections within the local cube and by a second, higher speed interface such as 10G Ethernet for connections among cubes.

The problems of Ethernet switched backplane architectures in terms of latency, flow control, congestion management and quality of service are well known and described, for example, by Lee, "Computation and Communication Systems Need Advanced Switching," *Embedded Intel Solutions*, Winter 2005. These issues have generally discouraged the adoption of serial I/O protocols for communications between processors and memory that would typically be limited to the smaller physical dimensions of a circuit board or a computer or communication rack or cabinet having multiple cards/blades interconnected by a backplane. Instead, the trend has been to increase the capacity of individual chips and the size of each of the server blades in order to accommodate more processors and memory on a single chip or circuit board, thereby reducing the need for processor and memory interconnection that must be mediated across the backplane.

As processor speeds, memory speeds and network speeds continue to increase, and as the external I/O is increasingly capable of delivering data at rates exceeding gigabit speeds, the current architectures for arranging the subsystems within a computing and communication architecture are no longer efficient. There is therefore a need for a computing and communication architecture that is not constrained by the current limitations and can provide a solution that is compatible with industry configuration standards and is scalable to match the speed and capacity requirements of a converged computing environment internal, as well as external, to the motherboards of the next generation computers and communications equipment.

SUMMARY OF THE INVENTION

The present invention is directed to a computing and communication architecture that utilizes a serial protocol based switched fabric among circuit cards housed in packaging arrangement. In one embodiment, each circuit card connected to the serial protocol based switched fabric in the packaging arrangement is provided with a protocol processor that enables all of the circuit cards to efficiently provide packet-based serial self-clocked communications at line speed. As a result, it is not necessary to arrange the circuit cards in a hierarchical manner in order to address the problems of switch blocking and related traffic congestion issues that would otherwise limit the implementation of the serial protocol based backplane arrangement for housing circuit cards.

In one embodiment, a computer system in accordance with the present invention, the housing arrangement is based on the advanced Telecommunication Computing Architecture (TCA) and is implemented as a multi-card Advanced Mezzanine Card (AMC) computer system with an Ethernet backplane switching fabric. In one version of the embodiment based on an advanced TCA packaging arrangement there is at least one processor card, and, optionally, a graphics processor card, a hard disk drive card and a memory card that are all interfaced to a management card having a multi-port Ethernet switch. All of the processor cards and the memory card are connected via a backplane with the multi-port Ethernet switch on the management card as the inter-card Ethernet switched fabric for the computer system via bit stream protocol processor chips located on each card. In one embodiment, the computer system is housed in a 3×2 picoTCA complaint packaging arrangement with redundant power supplies and shelf management functionality. In this embodiment, conventional microprocessor cards may be utilized with a bit stream protocol processor coupled on each processor card to the north-side bridge chip to package all off-board communications as high-speed Ethernet switched packets and a bit stream protocol processor is also utilized on the extended memory card to interface between a memory controller chip and the Ethernet fabric of the computer system.

In one embodiment, the inter-card Ethernet switched fabric is accomplished through a 10 GigE Ethernet interface via a bit stream protocol processor and interface logic separate from the microprocessor/controller chip and a 10G Ethernet interface. The bit stream protocol processor encapsulates the memory address and control information like Read, Write, number of successive bytes etc, as an Ethernet packet and the memory provisioned on the processor, decodes it, performs the action and encapsulates the result on to Ethernet, which is decoded by the bit stream protocol processor. In another embodiment, communication overhead is further reduced by using a bit stream switch where VLAN or tunneled connection paths for transmission of shorter burst width packets can be established using an extended Ethernet communication protocol.

In one embodiment, a 10G connection can be established between the elements on a blade, board or card via the bit stream protocol processor and interface logic. In another embodiment, a plurality of blades are configured to permit Ethernet connectivity over a backplane and may be communicatively coupled using a non-blocking, Ethernet based switching fabric. In still another embodiment, a plurality of processors are configured to permit Ethernet connectivity with main memory located on separate blades, boards or cards, or even in separate shelves or chassis over cabled connections and may be communicatively coupled using a non-blocking, Ethernet based switching fabric.

In one embodiment, the present invention eliminates the need for a Network Interface Card (NIC) as the definition of the edge of an Ethernet network. In a PC, blade server farm or telecommunication cabinet, the NIC boards are the only access point to the Ethernet network and thus they represent the "edge" of the Ethernet network in that the NIC is assigned a Media Access Control (MAC) addresses that gives that piece of computing equipment a unique identifier on the network such as the Internet. Individual components within that given piece of computing equipment corresponding to a given NIC are generally not assigned MAC addresses. In contrast, the present invention extends MAC addresses to the edges of each AMC card within the packaging arrangement and utilizes the Ethernet switch fabric connections to communicate data and instructions among the cards within the packaging arrangement, as well as externally to that packaging arrangement.

The above summary of the various embodiments of the invention is not intended to describe each illustrated embodiment or every implementation of the invention. The figures in the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 6 illustrates a block diagram of another embodiment of a bit stream protocol processor in accordance with one embodiment of the present invention.

Figure 1:
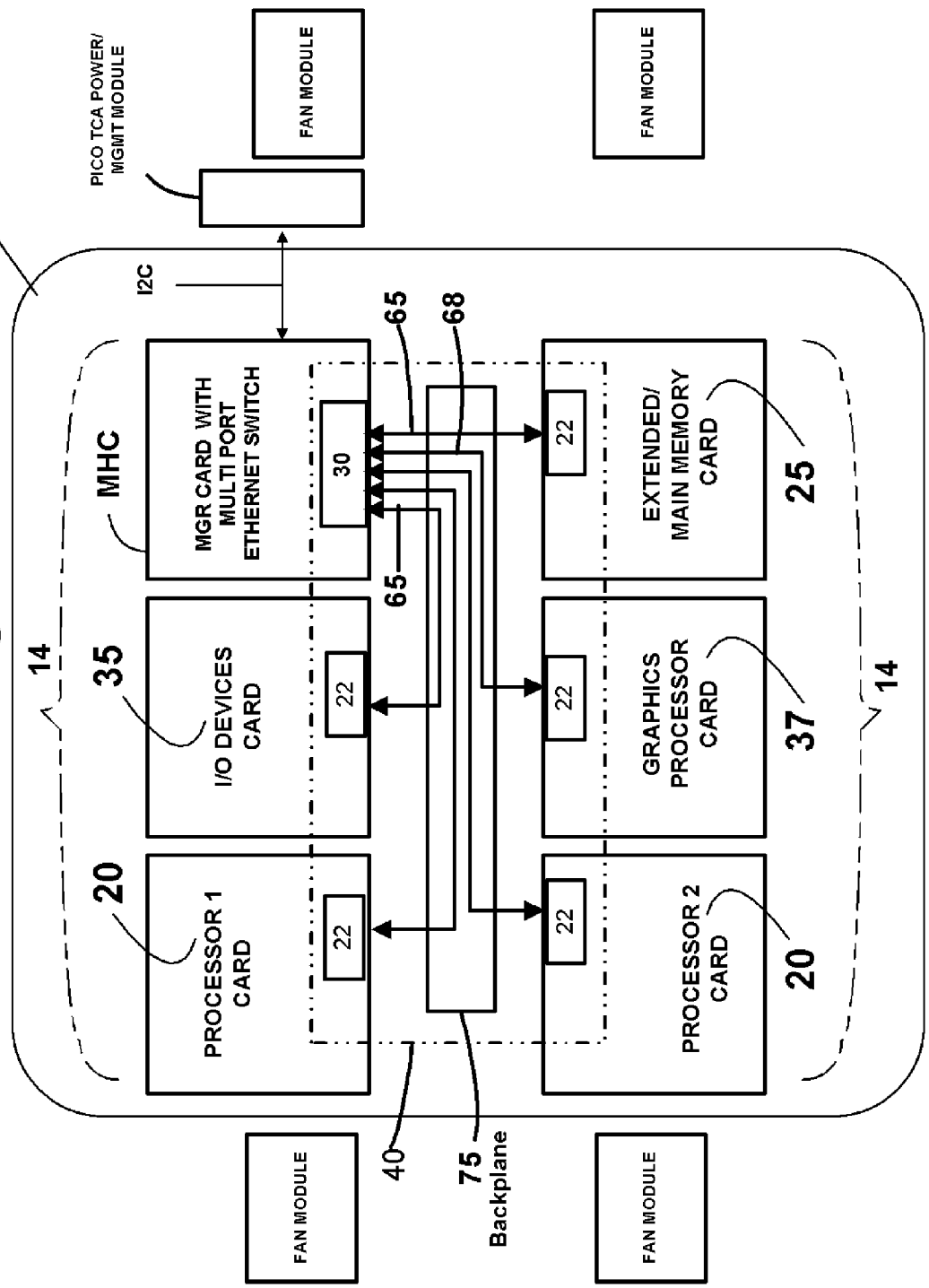
FIG. 1 depicts a block diagram of a computing system in accordance with one embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

FIG. 1 depicts a computer system in accordance with one embodiment of the present invention that is implemented as a multi-card Advanced Mezzanine Card (AMC) computer system based on an advanced TCA packaging arrangement having at least one processor 20 card, and, optionally, a graphics processor 37 card, a I/O devices 35 card and an extended memory 25 card that are all interfaced to a management card MHC having a multi-port Ethernet switch 30. All of the processor cards and the memory card are connected via a backplane 75 with the multi-port Ethernet switch 30 on the management card MHC as the inter-card Ethernet switched fabric for the computer system 10 via bit stream protocol processor 22 chips located on each card.

Figure 3A:
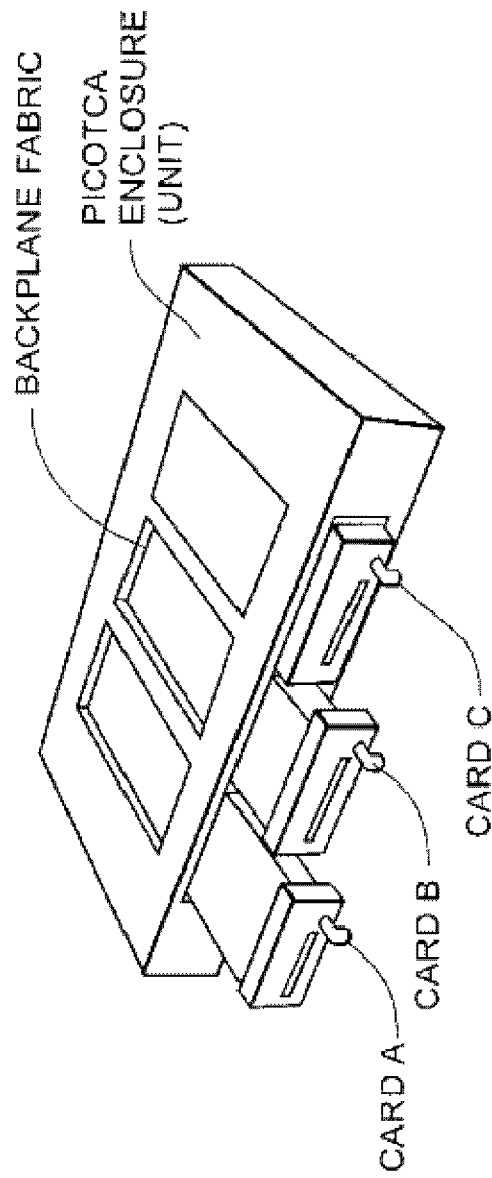
FIGS. 3A and 3B depict a picoTCA enclosure (standalone) and stacked picoTCA enclosures with several cards plugged into am Ethernet backplane switching fabric in accordance with one embodiment of the present invention.
Figure 3B:
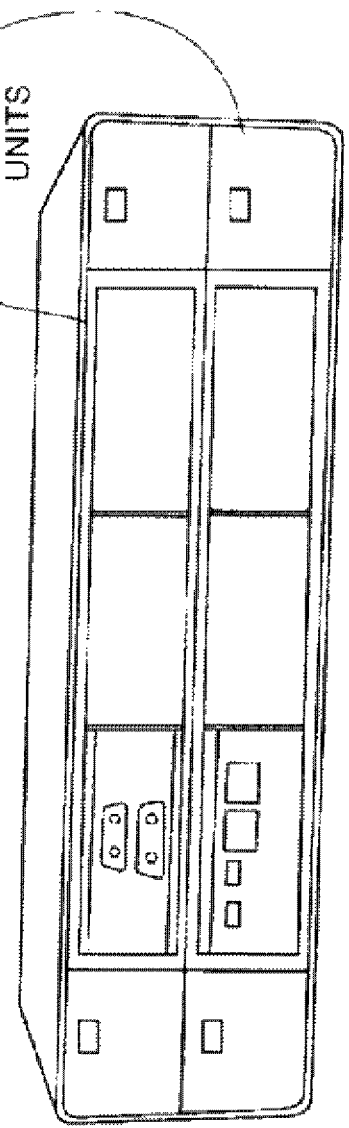

In this embodiment, the computer system is housed in a 3×2 microTCA based packaging arrangement shown in FIG. 3B, with redundant power supplies and shelf management functionality for each 3-wide microTCA shelf that can implement a picoTCA packaging arrangement. In this embodiment, conventional microprocessor microTCA cards may be utilized with a bit stream protocol processor 22 coupled on each processor card to the north-side bridge chip to package all off-board communications as high-speed Ethernet switched packets and a bit stream protocol processor 22 is also utilized on the extended memory card to interface between a memory controller chip and the Ethernet fabric of the computer system.

In one embodiment of the present invention as illustrated in FIG. 1, the computer system 10 includes a plurality of cards that are dimensioned to conform to an industry standard and configured to be received in an enclosure whose dimensions and operability are also prescribed by the same or an alternative industry standard. The cards and enclosure cooperatively constitute the computing/communication processing system of the present invention. The industry standard may be compatible with the microTCA standard or the ATCA standard well known in the art. The enclosure is configured to receive a plurality of cards, 14. Each card may be differentiated in terms of the functionality it is configured for. For example, the card may be a memory card, a processor card, a storage area network card, a secondary processor card, a server card, a secondary fabric card and so forth. However, each card is provided with a bit stream protocol processor 22 that interconnects communications, both memory and I/O, via the Ethernet switched fabric backplane 75 at Ethernet line speeds.

Referring now to FIG. 1, there is illustrated one embodiment of the present invention wherein the system memory 25 is at least partially resident on a card that is other than the card carrying the CPU 20. One skilled in the art will recognize that other physical configurations are possible wherein the—CPU 20, the system memory 25, the I/O devices 35 and graphics processor 37 may be resident on the same or separate cards without departing from the scope of the present invention.

Figure 2:
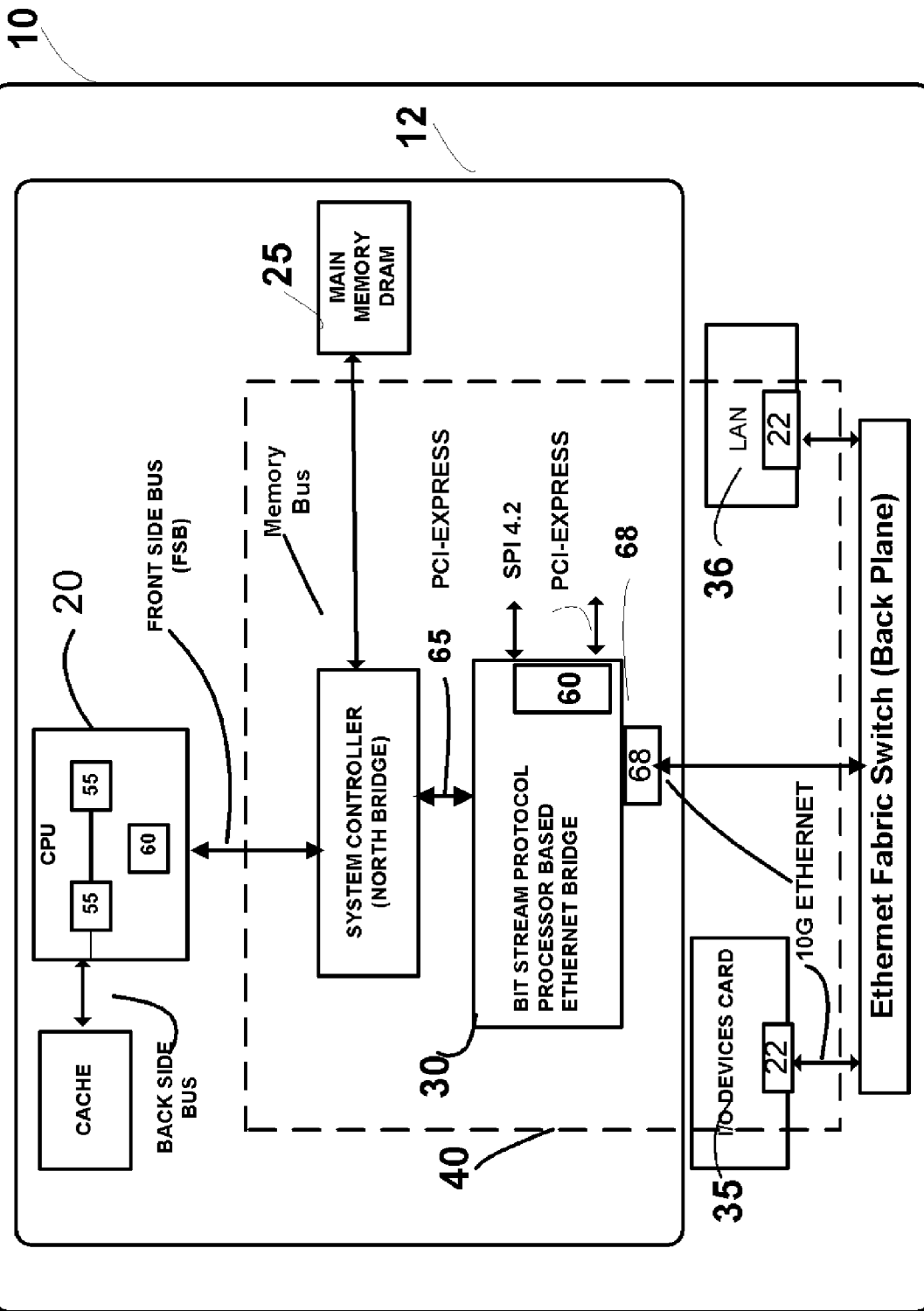
FIG. 2 depicts one embodiment of an AMC card forming a processor card in accordance with one embodiment of the present invention.

In another embodiment of the present invention shown in FIG. 2, the CPU 20 is operably coupled to the first type of serial data transmission interface using the front side bus. The serial data transmission interface is a portion of the communication topology 40 which may comprise one or more parallel buses, serial inter-connects, serial and parallel interfaces for communicatively coupling the communication topology 40 to one or more of the CPU 20, a switch 30, a main memory 25, I/O devices 35 and graphics processor 37. In a general embodiment illustrated in FIG. 2, the front side bus (FSB) of a conventional prior art chip, such as the Pentium 4 microprocessor, for example, is part of the communication topology 40. The FSB and the system controller (i.e. the Northbridge chipset) is interfaced to the bridge chip (or protocol processor 22) that provides a two-way bridging function between a first and a second data transmission protocols. In another embodiment, an ASIC replaces the Northbridge or cooperates with the Northbridge. The ASIC is configured to interface with the FSB to create an Ether bridge that translates memory requests to encapsulated Ethernet packets. The ASIC in turn communicates with the bit stream protocol processor 22 of the present invention as will become clear from the following sections.

Currently, most front-side bus (FSB) speeds cannot deliver the performance required of telecommunication and computing applications designed to comply with contemporary industry wide standards. For example, the PICMG® Advanced Mezzanine Card (AMC) specification defines the base-level requirements for a wide range of next generation high-speed mezzanine cards. Currently, the AMC card interconnect is specified at 12.5 Gbps per differential pair. Xilinx operates at 8 Gbps and Fujitsu offers a 10-Gigabit Ethernet Switch. In comparison, the Intel Itanium 2 processor frontside bus (FSB) speed is approximately 667 MHz and the AMD Opteron (TM) Front Side Bus frequency is approximately 1.4-2.8 GHz. One skilled in the art will appreciate that the FSB is not recommended in the telecommunication and high performance computing applications designed to conform to the aforementioned industry specifications. Some computing platforms use a core bus but use a method to increase the effective bus speed seen by the processor. For example, the Pentium 4 is specified as having a 400 Mhz FSB. However, the basic FSB is a 100 Mhz 'quad pumped' FSB wherein the data is transferred twice per clock cycle, on the rising and falling edge and also transfers two bytes of data at a time to effectively give four times the throughput of a 100 Mhz front side bus. Clearly, such an approach cannot be advantageously scaled to meet the performance goals of the next generation networks described above.

Referring again to FIG. 1, FIG. 1 represents a block diagram of a computer system 10 configured in a blade-server configuration according to one embodiment of the present invention. Computer system 10 includes at least one central processing unit (CPU) 20 (alternately "processor 20"), a main memory 25, a switch 30 and input/output (I/O) devices 35. The switch 30 interfaces between the CPU 20, the main memory 25 and the I/O devices 35 via a communication topology 40. In one embodiment, system 10 is located on a single board 12 (alternately "mother board 12") of FIG. 2. In another embodiment, system 10 is distributed on several boards 14 as illustrated in FIG. 1. An alternate embodiment of the present invention, system 10 may comprise several boards 16 that may or may not be substantially similar to board 12 as will become clear from the description presented in the following paragraphs.

Processor 20 may be a general purpose processor, a network processor, a processor provided by a microprocessor unit such as, for example, one the Intel® Pentium® Processor Extreme Edition, the Intel® Core™2 Quad processor and the Intel® Xeon® Processor 5000 Sequence all of which are manufactured by Intel Corporation of Mountain View, Calif.; the AMD Turion™ 64 Mobile Technology, the AMD Athlon™ X2 Dual-Core, the AMD Opteron™ Processor Model 856, and the Dual-Core AMD Opteron™ Processor Model 890 all manufactured by Advanced Micro Devices of Sunnyvale, Calif.; a front side bus (FSB)-capable Virtex™-5 FPGA (field programmable gate array) module as a plug-in to an Intel® Xeon® CPU socket manufactured by Xilinx Inc., of San Jose, Calif. Other types of processors may also be used within the scope of this invention. In one embodiment, processor 20 may include more than one core 55 co-located within a single integrated circuit (IC) package. The cores 55 may be all alike or at least one core 60 may be different than the other cores 55 within the scope of the present invention.

Main memory 25 may be one or more memory chips adapted to store data at one or more memory locations and to allow access to such stored data directly by processor 20 such as, for instance, Static random access memory (SRAM), Dynamic random access memory (DRAM), synchronous DRAM (SDRAM), Double Data Rate SDRAM (DDR SDRAM), Direct Rambus DRAM (DRDRAM), or Fully Buffered dual-inline memory module (FB-DIMM). Main memory 25 may be a plurality of memories of the same type or forming a hierarchy in terms of the speed of access, capacity or other metrics well known in the art. The aforementioned main memory configurations are presented by way of exemplification and not by way of limitation of the present invention. Various other memory types are possible within the scope of the invention.

Figure 4:
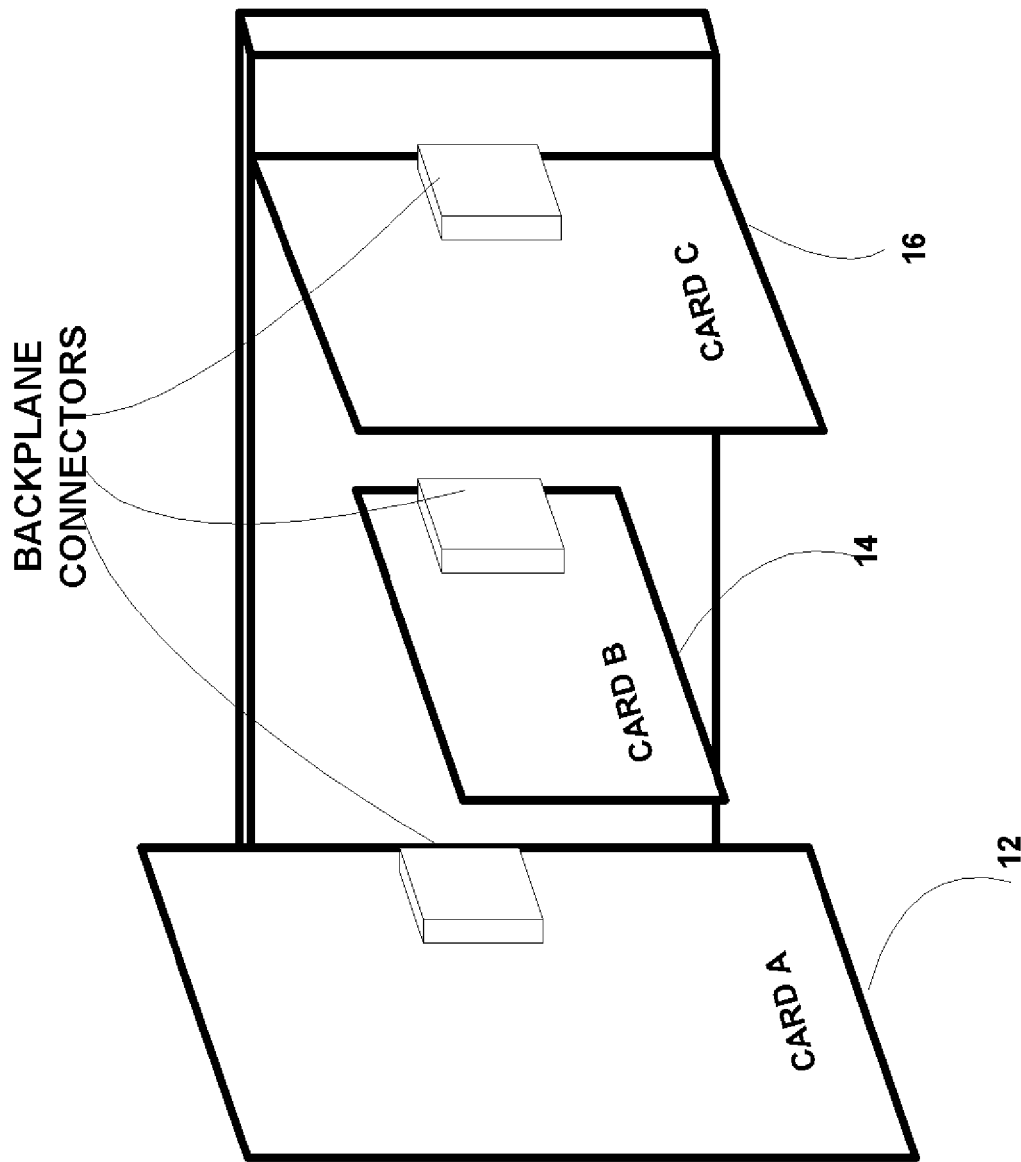
FIG. 4 illustrates a packaging architecture with a plurality of AMC cards connected through an Ethernet backplane switching fabric and the bit stream protocol processor on each card in accordance with one embodiment of the present invention.

In one embodiment, the present invention provides a switch 30 to achieve connection between processors 20, between processor 20 and main memory 25, and between processor 20 and the I/O devices 35. Switch 30 may include a switch core 60 and multiple ports 65, 68 coupled to switch core 60 for receiving and switching packetized communications between the one or more of the processor 20, main memory 25, I/O devices 35 or between one or more of the boards 12, 14 and 16 (FIG. 4). In a separate embodiment, switch 30 may be a bridge or a cross-bar switch, a packet switched communication fabric, or include a protocol bridging function within the scope of the present invention. Reference to a packet can include a packet, datagram, frame, or other unit of data, where appropriate. Switch 30 receives a packet from a first port 65 and switches the packet to one or more second ports 68, as described more fully below. In particular embodiments, the switch 30 is an Ethernet switch. In other embodiments, switch 30 can switch packets at or near wire speed. In an alternate embodiment of the present invention, the packets may be received at the first port 65 according to a first communication protocol but the bridging function of the—switch 30 may leave the switch at the second port 68 following a second communication protocol.

I/O devices 35 may comprise storage devices such as disk storage, flash memory, specialized processor chips/chipsets, graphics cards, printers, circuit boards configured identically like or with portions of system 10, disk controllers, network controllers to interface to networks such as Ethernet, USB and Firewire controllers, printers, digital cameras, wire-less devices and so forth without limiting the scope of the present invention.

In one embodiment, communication topology 40 comprises point-to-point interconnects 75 that communicatively couple each of the CPU 20, main memory 25, I/O devices 35 to one of the ports 65 of switch 30. In other embodiments, the CPU 20, main memory 25, I/O device 35 may be coupled to switch 30 using other connection configurations within the scope of the present invention. For example, in a selected embodiment, the communication topology 40 between processor 20 and the switch 30 may be based on a parallel communication bus such as, for example, the front side bus (FSB) communicating between a CPU and a Northbridge circuit illustrated in FIG. 2. Each of the CPU 20, main memory 25 and I/O devices 35 exchange communications according to selected packet protocols through the intermediation of the switch 30 as will be clear from the following description. Different protocols may use different packet formats and different commands in the packets. As an example but not by way of limitation, depending on the communication protocol used, switch 30 may be denominated an Ethernet switch (which includes a ten-gigabit Ethernet based switch—10 GbE); an InfiniBand® based switch 30; a HyperTransport™ based switch 30; a RapidIO® based switch 30, a PCI Express® switch (based on the PCI Express® Base 2.0 Specification managed and disseminated through the Special Interest Group (SIG) for PCI), or a proprietary backplane switch for storage systems, network systems, or both; or other switch using a proprietary serial communication protocol.

In particular embodiments, the switch 30 may bridge between several serial communication protocols whereby it receives communications at a serial interface associated with port 65 according to a first protocol (such as one of the aforementioned protocols) and transfers the received communications from a serial interface associated with second port 68 following a second protocol (such as one of the aforementioned protocols) different than the first protocol. Ethernet is a trademark of Xerox Corporation. All other products and/or company names may be trademarks or registered trademarks of their respective owners.

Figure 5:
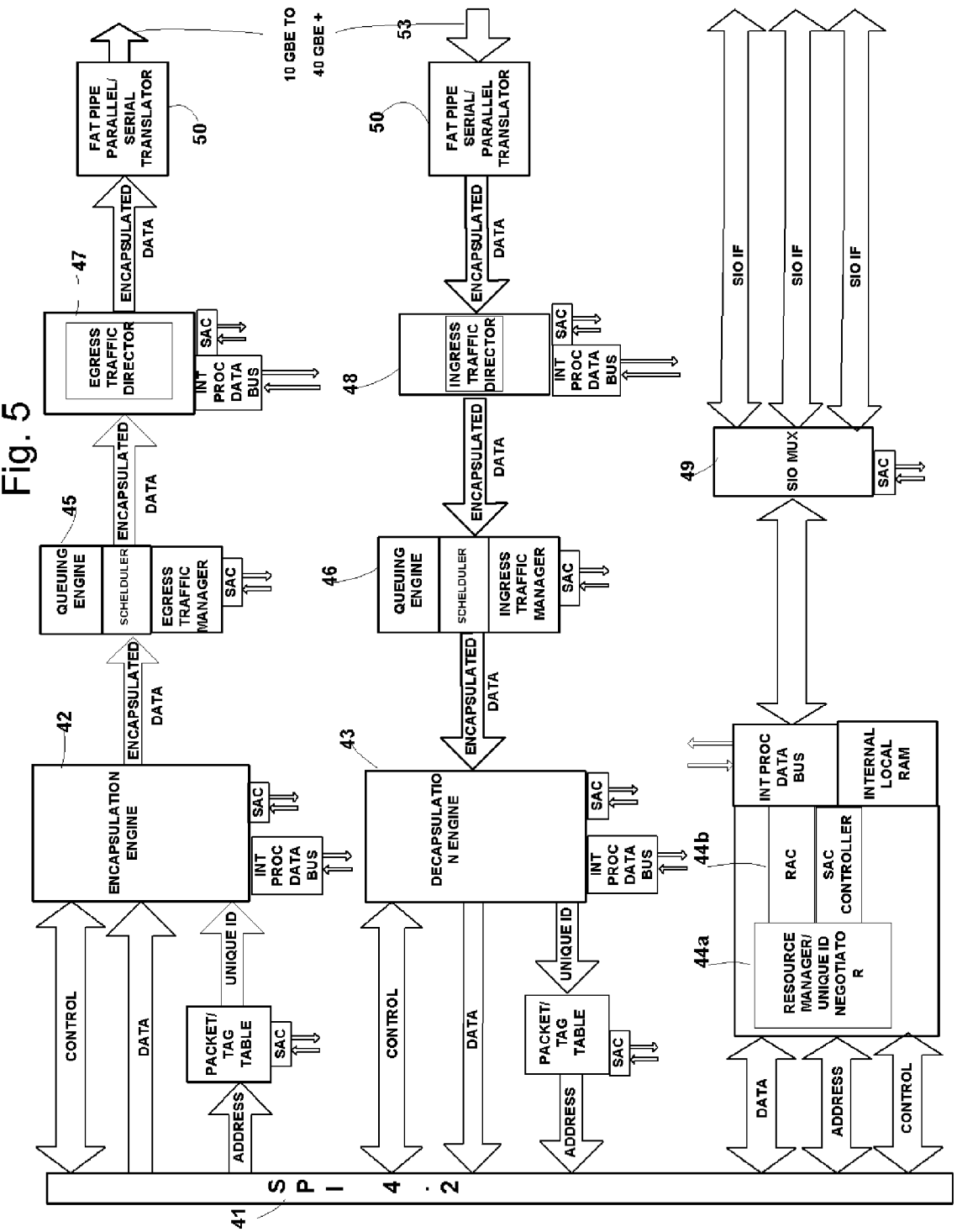
FIG. 5 illustrates a block diagram of one embodiment of a bit stream protocol processor in accordance with one embodiment of the present invention.

In one embodiment of the present invention illustrated in FIG. 5, the bridging function may be provided by the bit steam protocol processor based bridge providing a first serial protocol to second serial protocol two-way bridge architecture. By way of example, but not by way of limitation, apparatus, system and method in connection with a switch/bridge 30 of the present invention is in accordance the bit-stream processor system architecture described in co-pending U.S. Published Application No. 2007-0067481-A1, entitled "OMNI-PROTOCOL ENGINE FOR RECONFIGURABLE BIT-STREAM PROCESSING IN HIGH-SPEED NETWORKS," the contents of which are incorporated by reference herein in their entirety.

Referring now to FIG. 5, there is illustrated in functional block diagram format an exemplary implementation of a bridge architecture bridging between a parallel communication interface SPI 4.2 to XUAI but is applicable to any pairs of protocols without digressing from the scope of the present invention. The first type of data transmission—interface 41, in FIG. 5 corresponds to the Optical Internetworking Forum's (OIF) System Packet Interface Level 4 (SPI-4) Phase 2 Standard (SPI 4.2) parallel communication interface and the second type of serial data transmission interface 53 is the XAUI™ interface. XAUI™ is a trademark of the 10 Gigabit Ethernet Alliance XAUI Interoperability Group. The bit stream protocol processor 22 of this embodiment provides dual SPI 4.2 to XAUI bridges. SPI 4.2 provides a parallel, point-to-point, bidirectional interface. The SPI 4.2 Framing supports up to a maximum of 256 ports. Data is sent through the SPI-4.2 frame using the 16 LVDS data lanes, as one complete packet or as multiple data bursts per port.

In this embodiment, interface bandwidth can range from 10 Gbit/s for low overhead applications to 20 Gbit/s for applications such as switch fabrics that need bandwidth speedup in order to support overhead information. It will be seen that for 10 GigE each bit stream protocol processor 22 may support 10 Gbps full duplex per port, making it possible to attain a 2.560 Tbps switching throughput capacity. For 40 GigE, each bit stream protocol processor 22 may support 40 Gbs full duplex per port, making it possible to attain a 10 Tbps switching throughput capacity.

It will be recognized that the bit stream protocol processor 22 in accordance with one embodiment of the present invention can provide N interconnects between, for example, the system processor or CPU of the computer and the system memory. Each of the N interconnects may be configured to transfer data at 10 Gbps resulting in a scaled throughput of 10N Gbps. The SPI 4.2 is point to point interface between devices located with in a few inches of each other. In a system it is often desirable to interconnect SPI 4.2 devices which are located on different cards with in a chassis via a back plane (Intra Chassis) or located on different chassis (Inter Chassis). Under such circumstances it is advantageous to use the serial point-to-point links of various embodiments of the present invention that provide high bandwidth connections in IntraChassis or Inter-Chassis environments. Exemplary serial links include ASI using PCI-Express, Ethernet using XAUI, and Infiniband using IB. This in effect translates to connecting any two out of possible hundreds of geographically separated SPI 4.2 devices with a "Virtual Wire" interface. In one embodiment, the present invention may be configured as a single board computer (PC). In another embodiment, the present invention provides for a housing arrangement in accordance with industry standards (such as picoTCA for example) having an enclosure with removably attached blades that support field upgrades, including on-the-fly upgrades.

To transport control word, including port address, data and the out of band flow control information available on the parallel SPI 4.2 interfaces using serial links, or via a virtual wire, a tunneling protocol is utilized. To assure high bandwidth utility these tunneling protocols are preferably light weight. The tunneling features maybe embedded in to the SPI 4.2 devices or a bridge chip could be used in conjunction with the SPI 4.2 devices to provide this conversion. To support this bridging between SPI 4.2 devices using various serial interfaces using maturing tunneling protocols, the bridge is programmable. In this embodiment, the bit stream protocol processor 22—bridge—the SPI 4.2 interfaces 41 to XAUI 53 and other serial interfaces and are flexible means for various tunneling protocols.

Referring now to FIG. 6, another embodiment of a bit stream protocol processor 22 is shown. In this embodiment, the bit stream protocol processor 22 directly interfaces with the front side bus (FSB) 51, thereby eliminating certain of the translation processes in the bit stream protocol processor 22 described in connection with FIG. 5. In addition, the bit stream protocol processor 22 of FIG. 6 provides for both lean pipe 52 and fat pipe parallel-serial translators 50, thus permitting selective aggregation of one or more Ethernet ports for the fat pipe configurations.

In one embodiment, the bit stream protocol processor 22 allows line speed QoS packet switching (45, 46) which is utilized to implement a simple token based communication in Ethernet. The source address (SA) and destination address (DA) and E-type like VLAN Tag is used for negotiating a unique token between end points on a communication link (44*a*). The E-type extensions may be, for example, Request for UNIQUE ID or TOKEN GRANT; data communication with the granted token and request to retire the TOKEN. Once the TOKEN has been granted, the SA and DA fields are used (44*a*) along with the E-type to pass short data. This may also be extended to include large blocks of data for Serial ATA (SATA) and Serial Attached SCSI (SAS) interfaces. In other embodiments, once a UNIQUE ID is negotiated between end-points (44*a*), and an intermediate node connecting these end-points, a fixed frame size is used to endow the link with predictable performance in transferring the fixed frame and consequently meet various latency requirements. For example, the SA/DA pair could be used to transmit 12 bytes of data, 2 E-Type bytes and 2 bytes TAG, instead of the traditional 64 byte payload for a conventional Ethernet packet. For a more detailed description of one embodiment of this extended Ethernet communication technique, reference is made to co-pending provisional application Ser. No. 60/822,171, entitled "Enhanced Ethernet Protocol for Shortened Data Frames Within a Constrained Neighborhood Based on Unique ID," the disclosure of which has been incorporated by reference.

In another embodiment, the same interface could provide a fixed 2k Block size frame for Disc—(data follows the E-Type and TAG). In this respect, the present invention enables a programmable frame size Ethernet construct as opposed to the variable frame size construct known to the art. This capability can be especially useful in PICMG ® standard internal TDM (iTDM) type of applications because it enables packetizing TDM traffic within the framework of ATCA.

In one embodiment, Ethernet VLAN header is used as a tunneling protocol to allow the industry standard Ethernet Switches to be used to switch between any two SPI 4.2 devices located in an Intra Chassis or Inter Chassis environment. One embodiment of the present invention uses Gigabit Ethernet (GbE) as the second data transmission protocol. Other protocols may be used without departing from the scope of the present invention.

The SPI 4.2 control word and flow-control information is converted to a standard Ethernet VLAN header. The SPI 4.2 sub-channel data is encapsulated (42) with the header information at the ingress. At the egress, the header information is stripped from the Ethernet frame and converted back to SPI 4.2 frame (43) and the flow control information is translated to SPI 4.2 electrical signals. Additionally, the bit stream protocol processor 22 provides an efficient means to embed the Class of service information (42) and programmable means for generating and propagating Congestion Management messages (45, 46).

In one embodiment, the bit stream protocol processor 22 is configured to support interfaces such as GbE, PCI-Express, RGMII, PCI bus and Serial bus to make it an ideal universal device for use in ATCA and microTCA systems. One skilled in the art will recognize that other interconnect technologies such as for example, the XS4 10 Gigabit Ethernet and HiGig SPI4.2 Bridge from MorethanIP, to bridge an SPI4.2 interface to a XAUI interface to meet multiple design requirements such as device Bridging (e.g. NPU to Ethernet Switch), Serial Backplane applications, Packet over SONET/SDH or Ethernet over SONET/SDH applications.

The ability provided to interconnect SPI 4.2 devices which are located on different cards with in a chassis via a back plane (Intra Chassis) or located on different chassis (Inter Chassis) enables one embodiment of the present invention to achieve standards based PC such as for example, the picoTCA or the microTCA standard based PC architecture. An exemplary picoTCA enclosure is depicted in FIG. 3. One embodiment of the present invention includes a plurality of picoTCA enclosures stacked in an erector set configuration as shown and described in the co-pending application, U.S. Ser. No. 11/728,718, entitled "Modular Chassis Providing Scalable Mechanical, Electrical and Environmental Functionality for MicroTCA and Advanced TCA Boards," the entire contents of which are incorporated by reference.

In one embodiment, each picoTCA enclosure has its own switched fabric backplane that is placed in communication with the adjacent switched fabric backplanes of the picoTCA enclosures above and/or below the picoTCA box under consideration. The serial interface and switched fabric structure of the present invention eliminates the need for ribbon cables and other means to route a plurality of parallel links that characterize prior art interconnects. In some embodiments, the card, blade, board connection to the switched fabric as well as the inter-box connectivity may be provided by means of a cable terminating in a low pin count connector that is not as prone to failure as is a high pin count connector of the prior art. By enabling adherence to industry standards, embodiments of the present invention allows for interoperability with present and future market-leading technologies and vendor-specific product offerings.

One embodiment of the bit stream protocol processor 22 illustrated in FIGS. 5 and 6 advantageously utilizes the (register access controller; and sub-module access controller) RAC/SAC controller (44*b*) that endows the bit stream protocol processor with dynamic programming and function extensibility. The RAC/SAC controller structure is used to program the bit stream protocol processor 22 on-the-fly. This capability may be used to configure the blade (board) on which the bit stream protocol processor resides. In one embodiment, the on-the-fly dynamic programming capability is used to turn the blade (board) on or off thereby including or removing the blade from the computer system. In another embodiment the on-the-fly dynamic programming capability may be used to change the character of the bridge so that it bridges between SPI 4.2 and PCI-Express for example.

Those skilled in the art will recognize that other configuration changes may be affected within the scope of the present invention using the RAC/SAC controller (44*b*). For example, the programmability may be used to implement a real end-to-end QoS for various traffic flows through the computer system.

In another embodiment, the bit stream protocol processor 22 enables prioritized switching (45,46). In conjunction with the modular and scalable picoTCA PC architecture of the previous paragraph, the present invention allows the creation of an N-layered hierarchy of multiprocessors where N is both hardware independent and dynamically selectable by altering the prioritization afforded to different subsets of processors in the bit stream protocol processor mediated fabric. This embodiment enables the PC to be configured as a shared memory model machine as well as a message passing model multiprocessor machine. Alternately, a PC in accordance with one embodiment of the present invention may be configured as a server, a storage area network controller, a high performance network node in a grid computing based model, or a switch/router in a telecommunication network. It will be recognized that the same basic machine may be programmatically or manually altered into one or more of the aforementioned special purpose machines as and when desired.

In one embodiment of the present invention a non-blocking, 10G Ethernet switching fabric on the backplane is provided. The Ethernet fabric may be designed so as to conform to the extant IEEE P802.3ap specifications of the Backplane Ethernet Task Force, the disclosure of which is hereby incorporated by reference. The non-blocking character may be obtained by substantially eliminating packet collisions on the fabric using a modified access policy for Ethernet data link layer as described in co-pending provisional application Ser. No. 60/822,171, entitled "Enhanced Ethernet Protocol for Shortened Data Frames Within a Constrained Neighborhood Based on Unique ID," the disclosure of which has been incorporated by reference.

One of the challenges preventing the prior extension of an Ethernet based switching fabric beyond the current level of the NIC has been the expected overhead associated with regenerating the spanning tree that represents the dynamic understanding of the topology of neighboring Ethernet connections. The increasing the number of MAC addresses that need to be assigned as a result of extending the edge of the Ethernet switching fabric beyond the NIC level will result in a predictable increase in the amount of time that is necessary to resolve the Spanning Tree Protocol (STP) that is used to update all of the nodes in the network and generate a set of neighboring Ethernet addresses when they are any changes of computing equipment within the firewall of a given organizational entity, for example.

Versions of this embodiment provide for several approaches to addressing the issues associated with the overhead of solution of the spanning tree protocol as a result of populating a given organizational network with a larger number of MAC addresses that extend the packet switched fabric to the card level with the computing architecture in accordance with the present invention.

In one embodiment, MAC addresses could be assigned only at switch 30 on MHC of a given box and an internal configuration could be used within the box with a bit stream protocol processor 22 provided on the network edge of the switch 30 that would be responsible for further processing of packets as they cross the box/network boundary. One internal configuration could be the use of an extended Ethernet addressing scheme within the box that would be adapted to better facilitate the transmission of shorter payload packets among the components within that box. Another internal configuration provides each card with a plurality of switched Ethernet ports, where some of those ports are effectively configured within the switch 30 on the MHC to be only capable of internal switching and other of the ports are adapted to send packets across the box/network boundary. In each of these embodiments, the bit stream protocol processors 22 on each card and at the MHC switch 30 are provided with additional intelligence and information to discriminate between internal packet communications and external packet communications and also to resolve the internal addresses for packets received from outside the box.

Another embodiment would assign MAC addresses at the card level and would rely on the increasing power of the processing of the spanning tree inside a given firewall boundary to address and an assumption that changes of MAC addresses within the firewall boundary will be no more frequent than changes of MAC addresses outside the firewall boundary such that the overhead associated with the regeneration of the spanning tree would be within acceptable limits.

Another embodiment utilizes known characteristics of the picoTCA boxes within a firewall boundary that are available through the RAC/SAC, IMPI or MHC to produce a pre-simplified version of the solution to the spanning tree within that firewall boundary. Another approach is to use the reduced STP approach as described in IEEE 802.1w.

One of the embodiments to go along with multiple extended memories may provide for multiple caches. In one embodiment, the processor card is provided with two switchable caches (like two register files for threads). A cache miss, the processor switches over from the first cache to the second cache to begin processing a second program thread associated with the second case. In another embodiment, there may be a cache per extended memory.

Concurrency control may be implemented as part of an extended Ethernet protocol in one embodiment. Alternatively, concurrency control may be utilized to "add" to the CPU wait cycles if more than one processor requests the same block of memory. In this way the concurrency control may become a component of latency because the processor and the instructions scheduled for execution cannot distinguish between data locality dependent latency (speed of access and transfer) versus concurrency control based data access "gap" because barring data mirroring concurrent access is not instantaneous access.

In another embodiment, a four Channel Fully Buffered-Dual In Line Memory Module (FB-DIMM) memory may be connected to 40G lines, 53 and terminated to FB-DIMM lanes. The Advanced Memory Buffer (AMB) is 10 lanes serial south bound and 14 lanes serial North bound. The embodiment could support a switched fabric that may be 16 Lane Fabric. It is interesting thing to note that this AMB is <5 Gbps Total bandwidth coming out of the memory Controller. In an embodiment that utilizes 10G per lane, such as with Fujitsu Axel X, there is a need for only one 10G lane to get this out. If more bandwidth than 5 Gbps is needed, multiple AMBs or multiple lanes may be used. It should be noted for this embodiment that there is Serialization and De-serialization on DRAM end and the assumption is there is serialization and de-serialization on the processor side. The argument then reduces to latency penalty of the Switch, and any over head in the Serial and de serial method.

In one embodiment, latency and contention/concurrency issues within the Ethernet switched fabric are resolved within a "contained network" Deterministic latency (tolerable margin jitter) through a "well contained network" (such as the packaging arrangement as described herein) is indeed possible. Switching priority, dedicated ports (a pseudo port to dedicated memory ports, communicating over Unique IDs between these ports are the methods to achieve this.

In another embodiment, the present invention can be adapted to support a mesh architecture of processor-to-processor interconnection via the switched Ethernet fabric. In one embodiment, N−1 connections are made to each node with each node have 2 connections to all other nodes. In other embodiments, different combinations of number of Ethernet ports/card, number of ports/switch and number of switches/packaging arrangement can provide for various combinations of connections per node.

Each of the figures, apparatus and methods disclosed herein may be used separately, or in conjunction with other features and methods, to provide improved devices, systems and methods for making and using the same. Therefore, combinations of features and methods disclosed herein may not be necessary to practice the invention in its broadest sense and are instead disclosed merely to particularly describe representative embodiments of the invention.

For purposes of interpreting the claims for the present invention, it is expressly intended that the provisions of Section 112, sixth paragraph of 35 U.S.C. are not to be invoked unless the specific terms "means for" or "step for" are recited in the subject claim.

What is claimed is:

1. A computing and communication apparatus adapted for interconnection to the Internet, the apparatus comprising:
   a plurality of circuit cards which use packet frame switched full duplex serial communication for all external communications of the cards including memory and input/output accesses; and,
   a communication fabric providing packet frame switched full duplex serial communication over a backplane via a serial packet frame switching device to the said circuit cards; and,
   the said circuit cards and the said communication fabric are housed in a packaging arrangement; and,
   each of the said circuit cards is communicably interconnected via the said communication fabric serial packet frame switching device; and,
   each of the said circuit cards is communicably interconnected to the Internet via the said serial packet frame switching device; and,
   at least one of the said circuit cards includes a protocol processor which encapsulates the memory and input/output access including instruction access of the circuit card to serial packet frame to provide full duplex serial packet-based communication for the circuit card over the backplane at a speed in excess of one gigabits per second.

2. The apparatus of claim 1 wherein at least one circuit card includes a protocol processor chip connected to a general purpose processor with a front side bus to provide protocol conversion of the said processor's front side bus protocol to the serial protocol of the said serial packet frame switching device.

3. The apparatus of claim 2 wherein a field programmable gate array (FPGA) chip is operably configured to provide the functions of the said protocol processor as part of the FPGA chip.

4. The apparatus of claim 3 wherein the field programmable gate array (FPGA) chip is operably configured to provide the functions of the said general purpose processor as part of the FPGA chip.

5. The apparatus of claim 1 wherein one of the plurality of circuit cards also provides the communication fabric.

6. The apparatus of claim 5 wherein the said serial packet frame switching device is an Ethernet switch.

7. At least a first apparatus of claim 6 wherein one of the plurality of circuit cards is general purpose processor card; and,
   at least a second apparatus of claim 6 consisting of a plurality of circuit cards includes a memory card; and,
   the said first apparatus interconnects to the said second apparatus via the Internet; and,
   the memory card of the said second apparatus serves as the program memory card to the general purpose processor card of the said first apparatus.

8. At least a first apparatus of claim 6 wherein one of the plurality of circuit cards is a general purpose processor card; and,
   at least a second apparatus of claim 6 consisting of a plurality of circuit cards including a general purpose processor card and a memory card, and an Input Output card and a system manager card, wherein a system manager enables and disables each of the said cards; and,
   the said first apparatus is interconnected to the said second apparatus via the Internet; and,
   the general purpose processor card or memory card or Input Output Card of the said second apparatus is brought on line to serve as additional card for the general purpose processor card of the said first apparatus by the said processor card of the said first apparatus messages to the system manager of the said second apparatus over the Internet.

9. A single board computing and communication apparatus adapted for interconnection to the Internet, the apparatus comprising:
   a plurality of devices which use packet frame switched full duplex serial communication for all external communications of the device including memory and input/output accesses: and,
   a communication fabric providing packet frame switched full duplex serial communication via a serial packet frame switching device to the said devices; and,
   the said devices and the said communication fabric are housed on the single board such that each of the said devices is communicably interconnected via the said communication fabric serial packet frame switching device; and,
   the communication fabric includes at least a protocol processor which encapsulates the memory and input/output access including instruction access of the devices to serial packet frame to provide full duplex serial packet based communication for the said devices at a speed in excess of one gigabits per second.

10. A single board computing and communication apparatus of claim 9 wherein the serial packet frame switching device is an Ethernet switch.

11. A single board computing and communication apparatus of claim 10 wherein the an Filed Programmable Gate Array (FPGA) is operably configured to provide the functions of the serial packet frame switching device.

* * * * *